United States Patent [19]

Coronel

[11] 4,333,309
[45] Jun. 8, 1982

[54] STEAM ASSISTED GAS TURBINE ENGINE

[76] Inventor: Paul D. Coronel, 208-H Eagle Heights, Madison, Wis. 53705

[21] Appl. No.: 116,867

[22] Filed: Jan. 30, 1980

[51] Int. Cl.³ .......................... F02C 7/047; F02C 6/18
[52] U.S. Cl. .......................... 60/39.09 D; 60/39.18 B; 60/726; 60/736; 60/226 R; 415/114
[58] Field of Search .................... 415/114, 115; 60/39.18 B, 39.18 R, 39.43, 726, 736, 39.09 D

[56] References Cited

U.S. PATENT DOCUMENTS

| | | | |
|---|---|---|---|
| 2,159,758 | 5/1939 | Diedrich | 60/39.18 B |
| 2,369,795 | 2/1945 | Planiol et al. | 415/114 |
| 2,586,025 | 2/1952 | Godfrey | 60/39.18 B |
| 2,955,422 | 10/1960 | Peterson | 60/39.18 B |
| 3,739,575 | 6/1973 | Falk | 60/39.18 B |

*Primary Examiner*—Louis J. Casaregola

[57] ABSTRACT

A gas turbine engine is disclosed which has an integral steam power system consisting of heat absorbing boilers which convert an unpressurized liquid into an expanded and heated steam by utilizing heat normally lost through component cooling systems and the exhaust system. Upon completion of the steam power cycle, the steam is condensed back to a liquid state through a condensing system located within the compressor and other functional components of the gas turbine engine. A system of high pressure air and friction seals restrict steam or liquid condensate within designed flow bounds. The gas turbine engine disclosed is designed to give improved fuel efficiency and economy for aircraft and land use applications.

10 Claims, 15 Drawing Figures

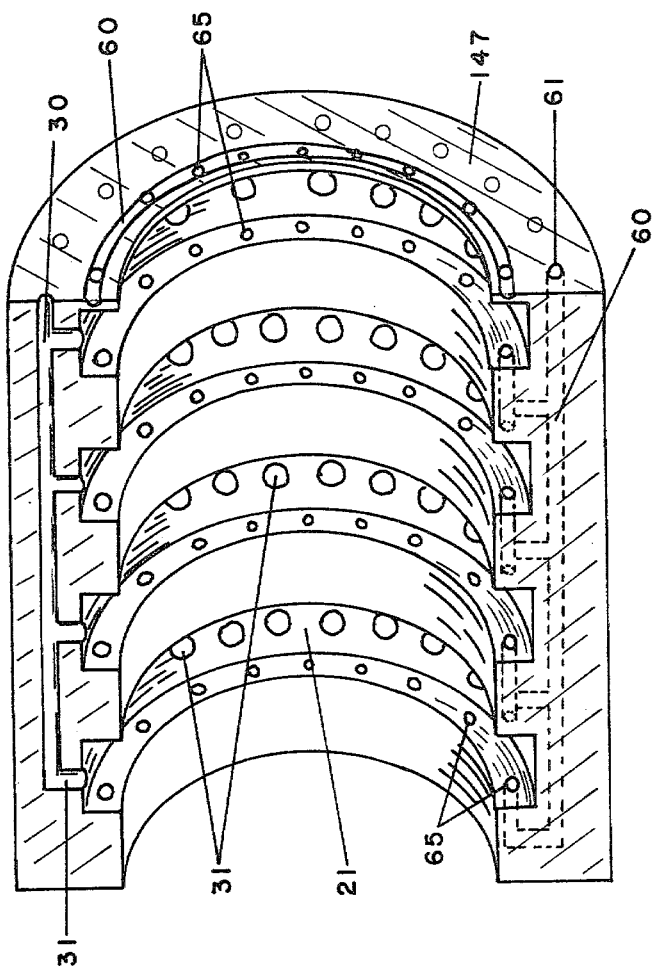
FIG. 4
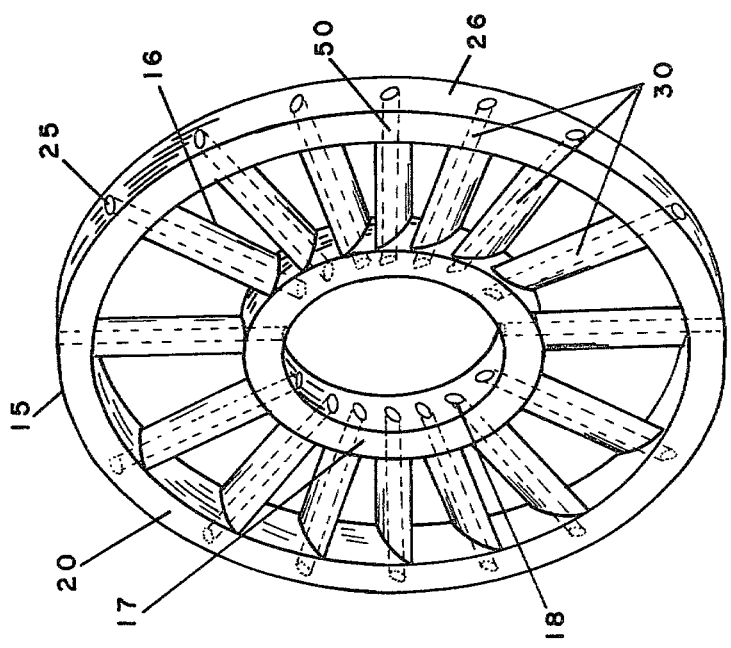
FIG. 2
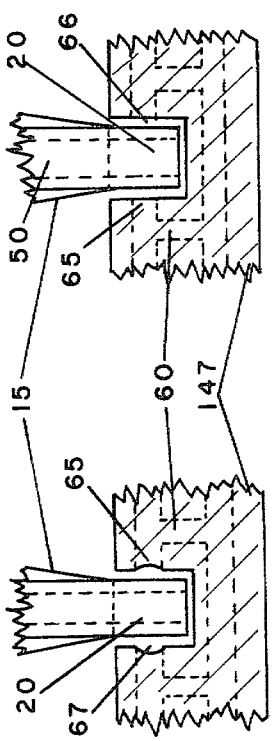
FIG. 6
FIG. 5

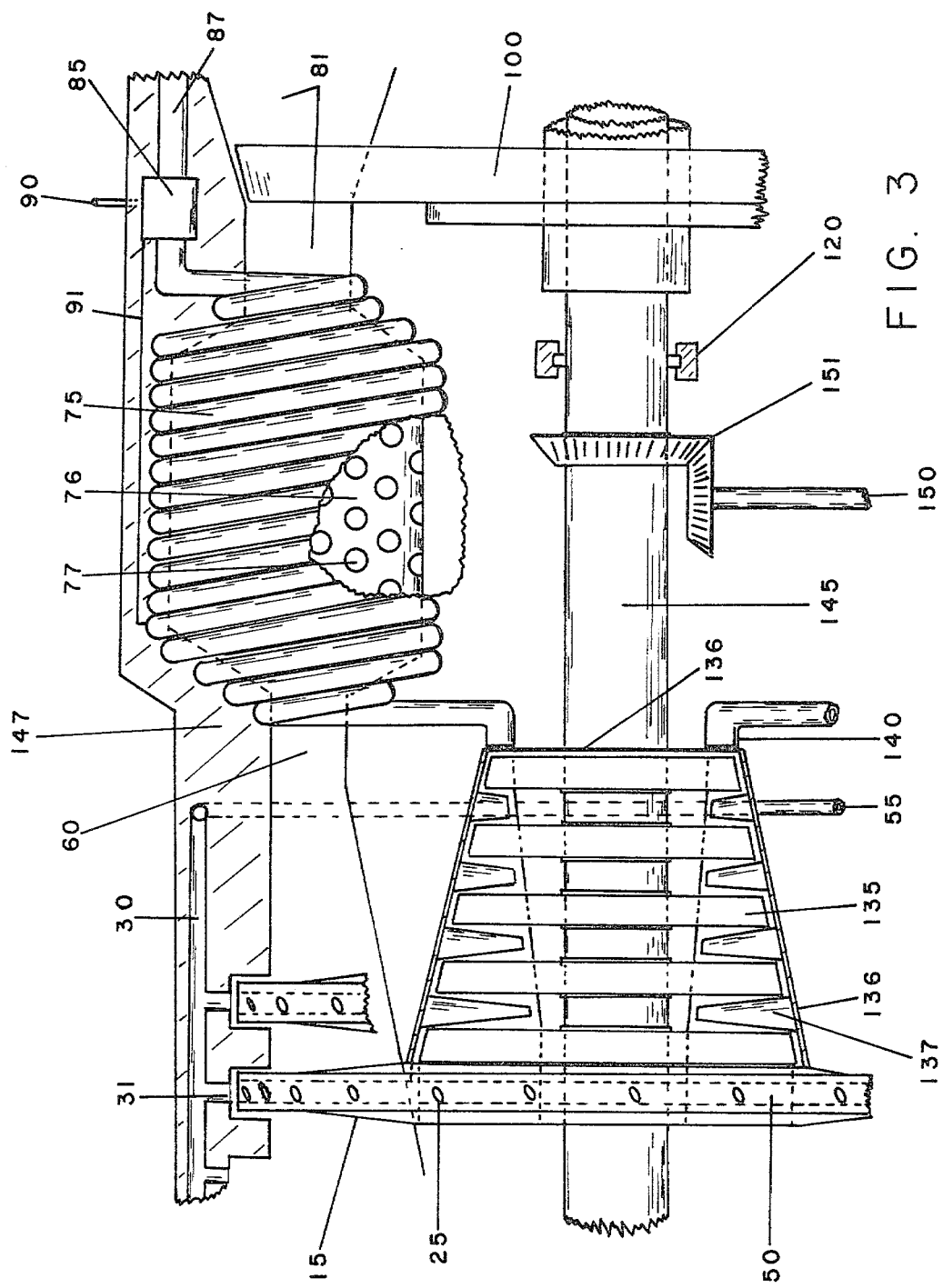

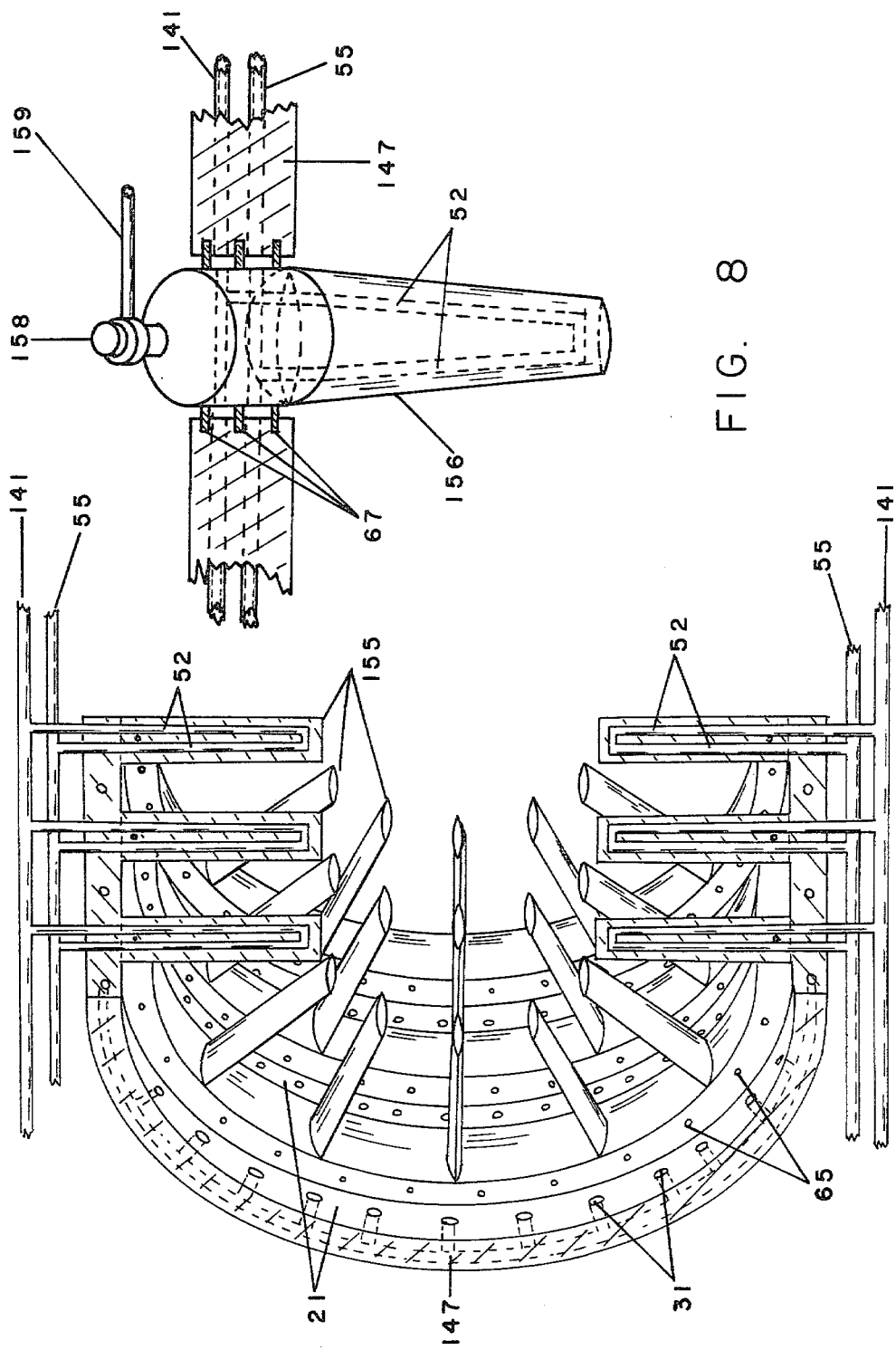

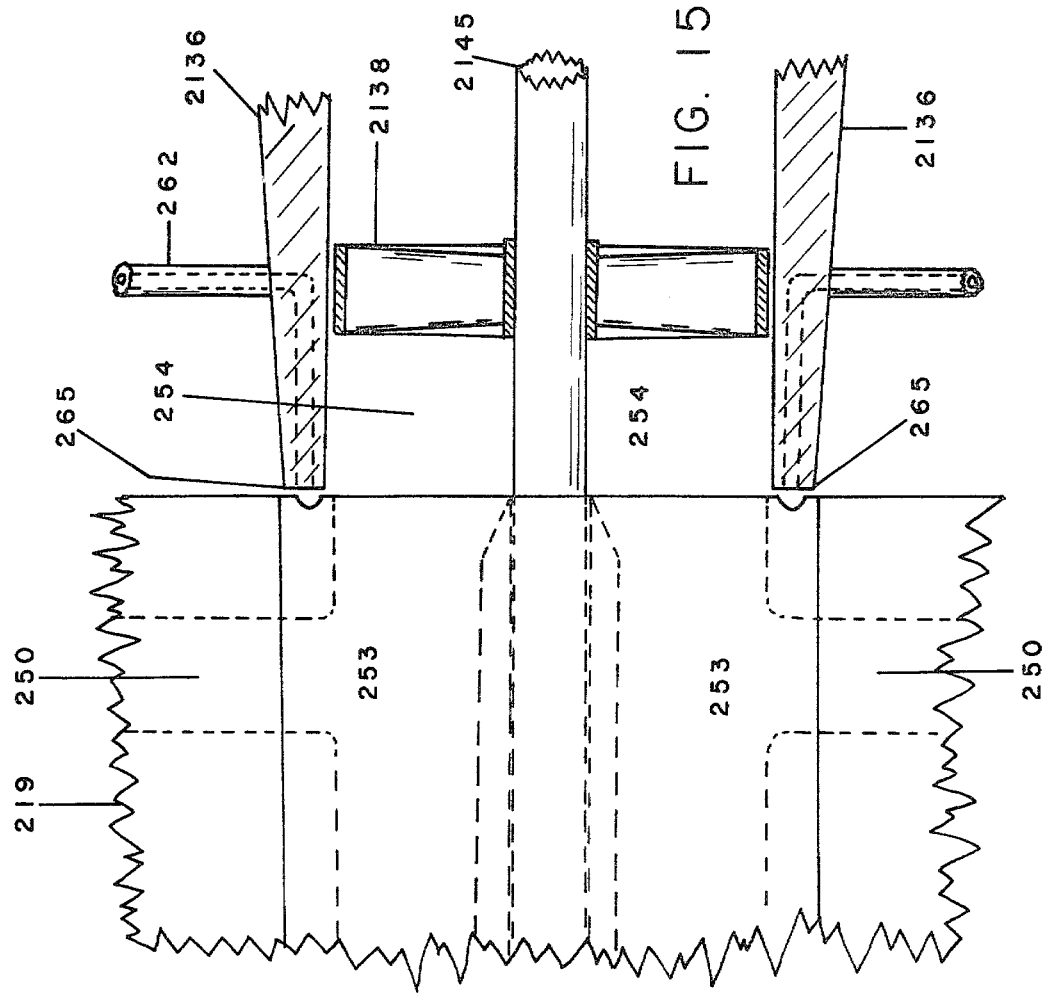
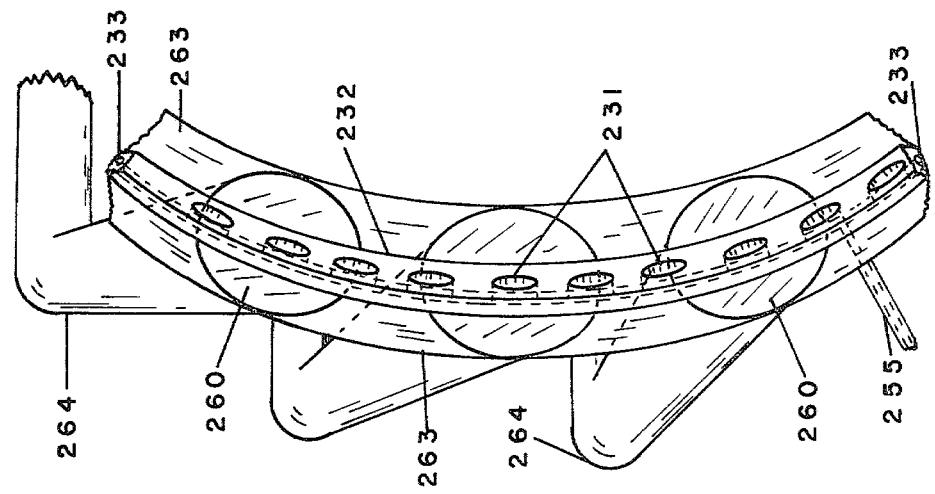

STEAM ASSISTED GAS TURBINE ENGINE

FIELD OF THE INVENTION

The present invention relates to gas turbine engines in general, and, in particular, to gas turbine engines having particular power enhancing systems designed to utilize heat normally lost through component cooling or exhaust processes, and to utilize this heat to create steam to assist in the energizing of the engine.

DESCRIPTION OF PRIOR ART

Gas Turbine Engines, as most heat engines work by compressing an elastic fluid, such as ambient atmospheric air, steam, combustible mixture or hot gas, then heating it, then allowing it to expand giving up energy to do useful work. The gas turbine, compared to a piston engine operates continuously and gives a steady power output in the form of a jet thrust or rotational motive energy. The common concept of a gas turbine utilizes a rotating shaft which drives a compressor which draws in ambient atmospheric air and compresses it with a fuel, burns this mixture expanding and heating it, then utilizes the exhaust of this process to drive turbines which in turn power the compressor. Motive energy from this process results from (1) utilizing the residual exhaust pressure to exert a motive force on the engine; (2) utilizing the rotational force of the drive shaft resulting from exhaust forces on the exhaust turbine; or (3) a combination of both. Presently, the only method of applying force to the drive shaft in currently utilized gas turbines results from the use of the exhaust forces inherent in the release of hot, high pressure, high velocity gases resulting from the combustion process which are directed to the exhaust turbine.

Compressors in modern gas turbine engines fall within two primary types: Axial and Centrifugal. U.S. Pat. No. 2,391,779 was granted for a "Turbo-Compressor Axial Type". This type consists of a number of fan-type wheels with blades which spin as one unit, progressively compressing an elastic fluid, usually ambient atmospheric air. U.S. Pat. No. 2,419,689 was granted for an "Axial Flow Gas Turbine" which combined the axial compressor and exhaust gas turbine with a combustion chamber. With the creation of the gas turbine came the need to produce methods of cooling gas turbine components to limits within the practical thermodynamic capabilities of materials utilized, especially those used in combustion chambers and exhaust turbines. U.S. Pat. No. 2,611,241 was granted for a "Power Plant Comprising a toroidal Combustion Chamber and an Axial Flow Gas Turbine with blade cooling Passages therein Forming a Centrifugal Air Compressor". This second type of compressor comprises a spinning disc with radially arranged guide-vanes which accept the air flow near the center and forces it off at high speed around the edge. U.S. Pat. No. 2,626,502 was granted for a "Cooling System for Gas Turbine Blading." This system injected cool air directly into the working cycle of the exhaust turbine to lower the exhaust temperature. U.S. Pat. No. 2,694,291 was granted for a "Rotor and Combustion Chamber Arrangement for Gas Turbines". This system utilized the injection of ambient atmospheric air through a centrifugal exhaust rotor to cool the rotor during its operation. The exiting cooling air would enter the exhaust gas flow. U.S. Pat. No. 3,756,019 was granted for a system which utilized single sets of turbine blades for dual functions. The interior portion of the circular turbine wheels were utilized as an exhaust turbine; the exterior portion of the circular turbine wheels were utilized as a compressor. Cooling for this system consisted of hollow passages within the turbine blades which passed air to function as a coolant. U.S. Pat. No. 3,756,020 was granted for a system which utilized a liquid cooling system for stator and rotor blades. The liquid which was heated by passing through these components was cooled in a radiator type heat exchanger with air bleeded from the compressor. This heated bleeded air was then vented into the atmosphere.

Modern gas turbine engines utilize bleeded compressor air for cooling of combustion burner casings, exhaust turbine components, and exhaust nozzles. No U.S. patents were noted for systems designed to recover this cooling heat energy and convert this energy into a power source capable of assisting in the power generating functions of gas turbine engines.

One of the functions of the disclosed present invention is to provide for a dual purpose rotary heat exchanger which compresses an elastic fluid and condenses a vapor to a liquid state. U.S. Pat. No. 2,158,858 was granted for a "Power Plant Apparatus For Aircraft" which operated by boiling a liquid, utilizing the generated elastic fluid to operate a turbine engine, then cooled and condensed the liquid with a fixed radiator type condenser. U.S. Pat. No. 3,424,234 was granted for a "Rotary Heat Exchanger" which operated by utilizing the centrifugal force created by rotation to force a heated liquid through it without the aid of a mechanical pump. The rotation of the heat exchanger also forced a second fluid through a series of ducted passages to absorb heat from the first fluid. This second fluid was then released to the atmosphere. Rotary power to operate this heat exchanger was supplied by a separate internal combustion engine. U.S. Pat. No. 3,567,589 was granted for a "Centrifugal Condensing Apparatus" which was rotated by an independent electric motor and condensed a vapor through the use of a sprayed liquid coolant and a jet extractor. Liquid condensate was collected in a collecting trough and piped out. No U.S. patents were noted for a system which utilized the compressor of a gas turbine to cool steam vapor resulting from the heat exchange cooling of gas turbine components and the application of the recovered heat converted to steam vapor to assist in the power generating capacity of the gas turbine engine. No U.S. patents were noted for a means of cooling gas turbine combustion chambers with an enclosed liquid-vapor cooling cycle.

REFERENCES CITED

U.S. Pat. No. 2,158,858, B. Hoffmann
U.S. Pat. No. 2,391,779, A. A. Griffith
U.S. Pat. No. 2,419,689, R. K. McClintock
U.S. Pat. No. 2,611,241, T. R. Schulz
U.S. Pat. No. 2,626,502, E. Lagelbauer
U.S. Pat. No. 2,694,291, H. C. Rosengart
U.S. Pat. No. 3,424,234, N. Laing
U.S. Pat. No. 3,567,589, A Javet
U.S. Pat. No. 3,756,019, H. Holzapfel
U.S. Pat. No. 3,756,020, S. Moskowitz and others

SUMMARY OF THE INVENTION

The present invention is summarized in that a gas turbine engine includes a steam power system consisting of boilers which are fired by the heat of the combustion and located at the point of combustion, within exhaust turbine blades, exhaust guide vanes, and the exhaust nozzle which convert a liquid into steam which powers a steam turbine attached to the main drive shaft of the engine. Upon completion of this steam power cycle, the steam is condensed to a liquid by a condensing system located within the compressor, compressor guide vanes, cowling supports, and auxillary heat exchangers. A system of high pressure air seals and friction seals restrict steam or liquid condensate from effusion from designed flow bounds.

It is an object of the present invention to construct a gas turbine engine for aircraft or land uses with superior fuel efficiency and economy than is presently available.

It is another object of the present invention to improve the efficiency of gas turbine engines by utilizing heat normally lost through exhaust or component cooling processes to assist in powering the gas turbine engine.

It is yet another object of the present invention to provide a gas turbine engine with an improved combustion process which will pre-heat combustion fluids through integral heat exchange systems designed within functional components of the gas turbine engine.

Other objects, advantages, and features of the present invention will become apparent from the following specification.

BRIEF DESCRIPTION OF THE DRAWINGS

FIG. 2 is a perspective view of a compressor-condenser wheel assembly for an axial flow steam power assisted gas turbine engine.

FIG. 3 is a side sectional view of the boiler, steam power turbine, condensation exit corridor, compressor-condenser wheel, main drive shaft, and exhaust turbine wheel.

FIG. 4 is a perspective sectional view of the main engine casing with a condensation exit system and high-pressure air seal feeder system.

FIG. 5 is a side sectional view of a portion of the main engine casing with a high-pressure seal feeder system, and a partial view of the compressor-condenser wheel.

FIG. 6 is a side sectional view showing an alternative design of the components in FIG. 5.

FIG. 7 is a perspective sectional view of the main engine casing with condenser guide vanes, steam flow lines in, and condensation flow lines out.

FIG. 8 is a perspective and sectional view of an adjustable condenser guide vane, guide vane adjustment mechanism, steam and condensation flow lines, and a friction sealing system between the guide vane and main engine casing.

FIG. 14 is a perspective view of a partial high-pressure impeller casing, condensation exit system, and high-pressure air exit system.

FIG. 15 is a side sectional view of the main drive shaft with attached steam power turbine wheel, centrifugal compressor-condensor impeller, steam exit to condenser corridor, and high-pressure air sealing system between the steam turbine casing and impeller edge.

DESCRIPTION OF THE PREFERRED EMBODIMENT

Figure 1:
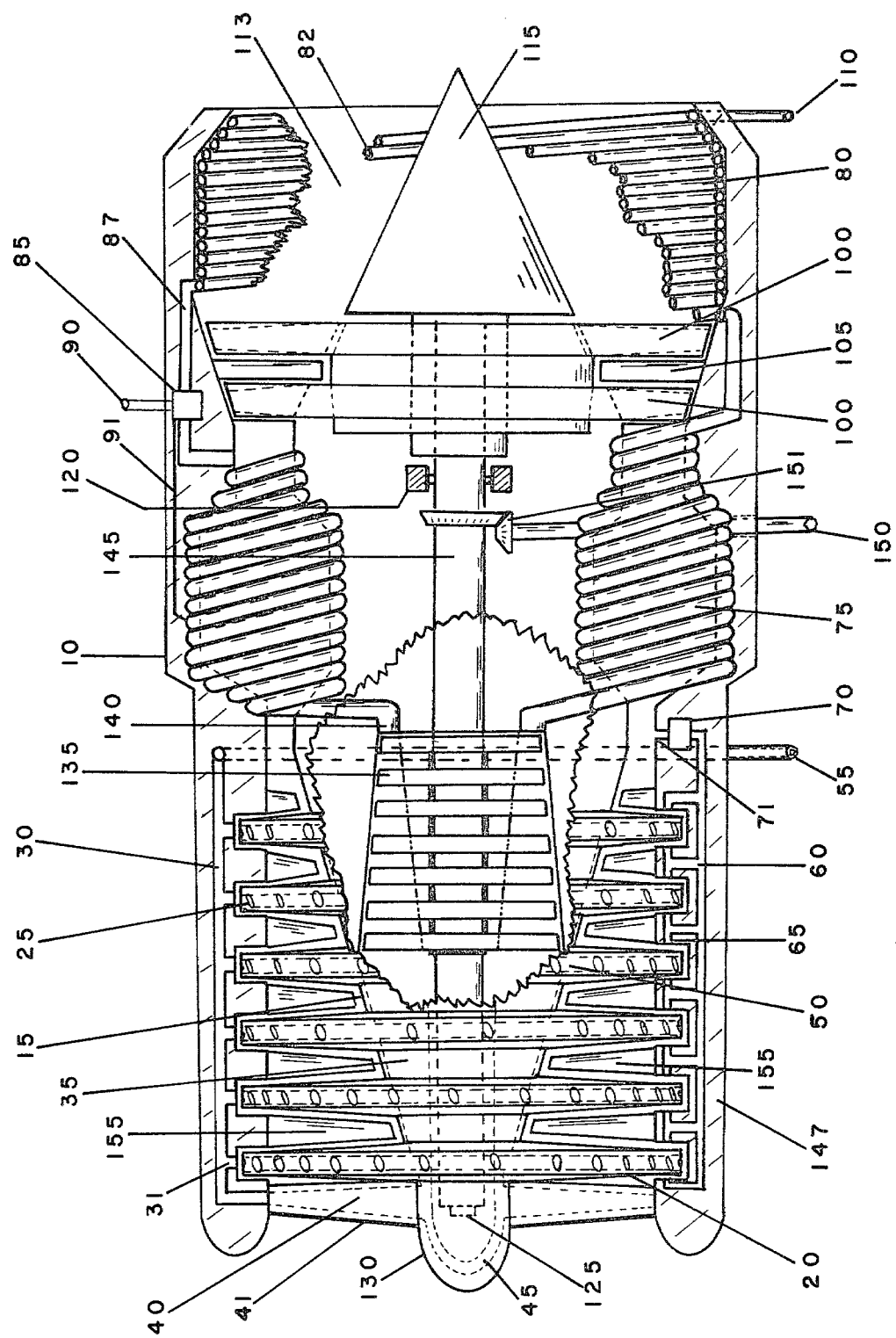
FIG. 1 is a side sectional view of a single-spool axial flow steam power assisted gas turbine engine.

Shown in FIG. 1 is a gas turbine engine, generally indicated at 10, constructed in accordance with the present invention. The engine 10, is formed around an elongated casing 147. The engine 10 as viewed from the front or rear is round. At the forward end of the engine is the intake cone 130 in which is located the front main drive shaft bearings 125, intake cone condensation corridor 45. Mounted on the main drive shaft 145 is the compressor-condenser wheel assembly 15, the steam power turbine assembly 135, accessory drive transmission gear 151, rear engine bearings 120, exhaust turbine drive wheels 100, and exhaust cone 115. The intake cone 45 is supported by the intake guide vanes 41. Within the intake cone and intake guide vanes are located the intake cone condensation corridor 45 and the air intake guide vane condensation corridor 40. These condensation corridors serve the dual function of condensing arriving from the steam passage corridor 35 and providing heat to all surfaces to prevent the formation of ice during operation of the engine in ice forming conditions. The primary advantage of this condensation function is that it condenses steam and eliminates the necessity for separate de-icing systems in the front of the engine. To the rear of the intake cone is the compressor-condenser wheel assembly 15. In the single-spool axial flow compressor, all compressor-condenser wheels turn as one unit and serve the dual functions of compressing atmospheric air from the ambient atmospheric pressure to a high pressure, and condensing a steam flow which has completed a power cycle by forcing against and expanding within the steam power turbine assembly 135 spinning the turbine and supplying motive power to the main drive shaft 145. The steam flow arrives to the compressor-condenser wheel assembly through the steam passage corridor 35. The steam next enters the rotating compressor-condenser wheel assembly and flows through the compressor-condenser condensation corridors 50 located within the compressor-condenser blades, condensing to a liquid. The liquid exits the turning compressor-condenser wheel assembly out of the condensation exit corridors 30 within the compressor-condenser blades 16. As shown in FIGS. 1 & 3, the exiting liquid next enters the entrance 31 to the condensation exit corridor 30. The condensed liquid exits the engine casing by flowing out the condensate line out 55 to filters and pumps operated by accessory drive shaft 150. To prevent any of the condensate from effusing from the designed flow path, a system of high pressure air seals are utilized. High air pressure for the seals is regulated by the high air pressure regulator 70 and directed along the high pressure air corridor 60. As indicated in FIG. 4, a series of air seal high pressure nozzles 65 are located within the wall edges of the compressor-condenser wheel shroud corridor 21 located on the main engine casing 147 and the compressor wheel shroud 20. As this pressure is greater than the pressure of the condensate leaving the compressor-condenser condensation corridor 50 and entering the condensation exit port and corridor 31 of FIGS. 1,3 & 4, this prevents any effusing of the condensate. While some high pressure air may enter the condensate exit corridor, it will be separated from the liquid condensate by a pressure release valve located near the liquid filter. Close construction tolerances will keep this high pressure air loss to a minimum. Two methods of creating the air seal between the engine casing 147 and the compressor wheel shroud 20 are described. The first preferred method utilizes an incurvate high pressure air seal corridor 67 of FIG. 5 to allow for a uniform high pressure seal along the entire edge of the compressor-condenser wheel shroud 20. The second method utilizes a flat high pressure air seal corridor 66. The primary advantages of utilizing high air pressure for sealing is that is reduces sealing friction to a minimum, thus producing minimum drag on the rotation of the compressor-condensor wheel assembly. The incurvate corridor is not limited to the compressor-condenser wheel, but may be incorporated into the engine casing wall as well.

Guide vanes are normally used in axial type gas turbine engines and are located between the individual compressor wheels and mounted in a fixed position on the walls of the engine casing. These guide vanes serve the functions of minimizing the vibrational effect of air flow variations, and guide the air flow between the compressor wheels along the compression corridor. Referring now to FIG. 7, a method of condensing steam to a liquid state with the use of compressor condenser guide vanes 155 will now be discussed. Steam enters the individual guide vanes 155 through steam lines in 141. This steam moves through the guide vane condensation corridor 52 where it is cooled by the heat exchange of air during the compression process. Steam condensate next exits the guide vanes through steam condensate lines out 55 and is directed to filters and liquid pumps for recycling into the boilers. In certain high performance gas turbine engines with axial compressors, asjustable guide vanes are desired to direct the airflow between power extremes of engine operation. FIG. 8 indicates a method of utilizing adjustable guide vanes for steam condensation which will now be described. Steam passing through the steam line 141 located in the main engine casing is directed between two friction seals 67 and forced into the guide vane condensation corridor 52. Steam condensate leaving the guide vand condensation corridor 52 is forced under pressure between two friction seals 67 and enters steam condensation line out 55. Adjustable guide vane 156 is adjusted by movement of guide vane adjustment lever 159 and the transference of this motion to the guide vane by guide vane adjustment pivot 158. The advantages of these systems are that stationary or adjustable guide vanes may be utilized as steam condensors by utilizing the compressor airflow to absorb heat inherent in steam.

The steam boiler assembly 75 of FIGS. 1 & 3 consists of metal tubing which is wrapped around the combustion burner casing 76 of FIG. 3 and joined or welded to form one air-tight unit. This hollow boiler serves the dual functions of heating a liquid to a steam state, and providing a heat absorbtion means of cooling the combustion chamber walls to prevent heat damage. Compressor air pressure at idle speeds may be regulated through the use of pressure release valves which vent excess pressure into the atmosphere. The primary advantages of this system is to eliminate the use of high pressure air for cooling purposes. This high pressure cooling air which has been produced at the expense of fuel utilization tends to limit maximum power production of the engine is eliminated by this invention. Steam produced in boiler 75 is directed to the steam drive nozzle 140 of FIGS. 1 & 3. Steam next enters the steam power turbine casing 136 of FIG. 3 and proceeds to expand through the progressively increasing steam power turbine wheels 100 The steam power turbine assembly 135 is joined to the main drive shaft 145 so that power generated from the steam flow on the steam power assembly is transmitted to the main drive shaft. Steam exiting the steam power turbine assembly enters the steam possage corridor 35 of FIG. 1 and enters the compressor-condenser condensation corridor and the intake condensation corridor for condensation to a liquid state.

Figure 10:
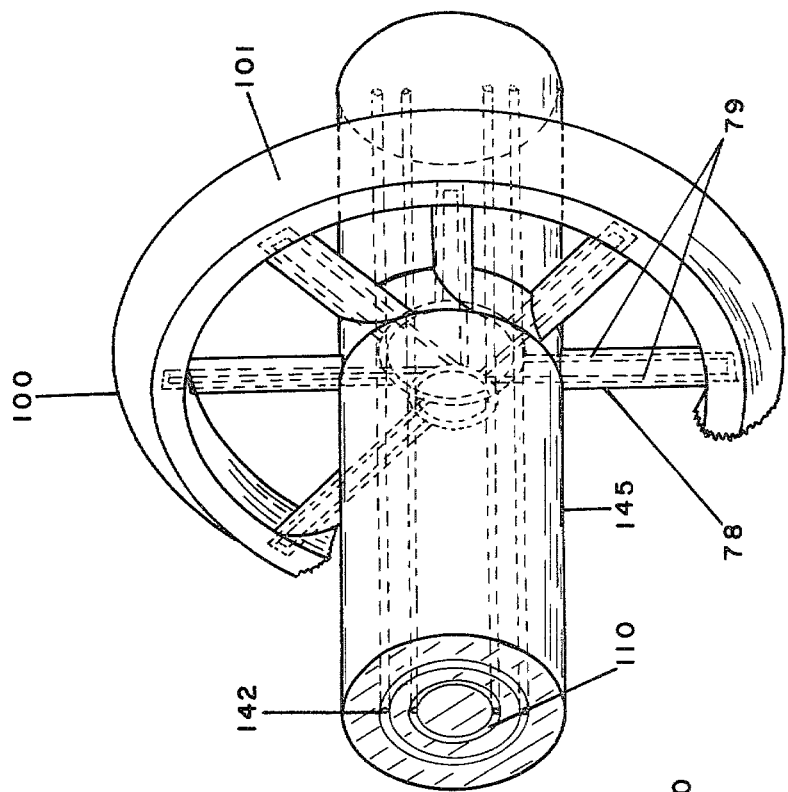
FIG. 10 is a perspective view of a partial exhaust turbine wheel with turbine-boiler blades attached to a main drive shaft with self-contained liquid and steam flow lines.

In its operation, engine 10 provides for additional locations of pre-heaters, heat exchangers, and boilers to produce steam from a liquid. The exhaust heat exchange tubing 80 of FIG. 1 absorbs heat from the exhaust gas flow of the combustion process and transfers this heat to a liquid which enters the liquid line in 110 from the liquid pumps. These pumps operate from power supplied by accessory drive shaft 150. The liquid-steam which has been heated by the exhaust heat exchange tubing 80 is directed along the steam corridor 87 to the fuel-steam heat exchanger 85 of FIGS. 1 & 3. The advantages of the fuel-steam heat exchanger are that fuel may be pre-heated prior to entering burners. The fuel-steam heat exchanger can work in combination with an oil heat exchanger. Pre-heated fuel contributes to more efficient burning. Referring now to FIG. 10, the operation of an additional boiler located within the exhaust turbine-boiler wheel assembly 100 is illustrated. Exhaust turbine-boiler blades 78 are connected on one end to the main drive shaft 145, and on the other end, to turbine shroud 101. The turbine boiler conduits 79 located within the turbine-boiler blades transfer heat from the exhaust gases produced by the combustion process to a liquid entering the turbine-boiler blades, boiling the liquid. The liquid enters the turbine-boiler blades from the liquid line in 110 located on the main drive shaft 145. Steam leaving the turbine-boiler blades exit from the steam line out 142 also located on the main drive shaft 145. Exhaust gas pressure against the turbine-boiler blades produce a driving force, spinning the turbine wheel. This motive force is transferred to the compressor-condenser wheels by the main drive shaft 145.

Figure 9:
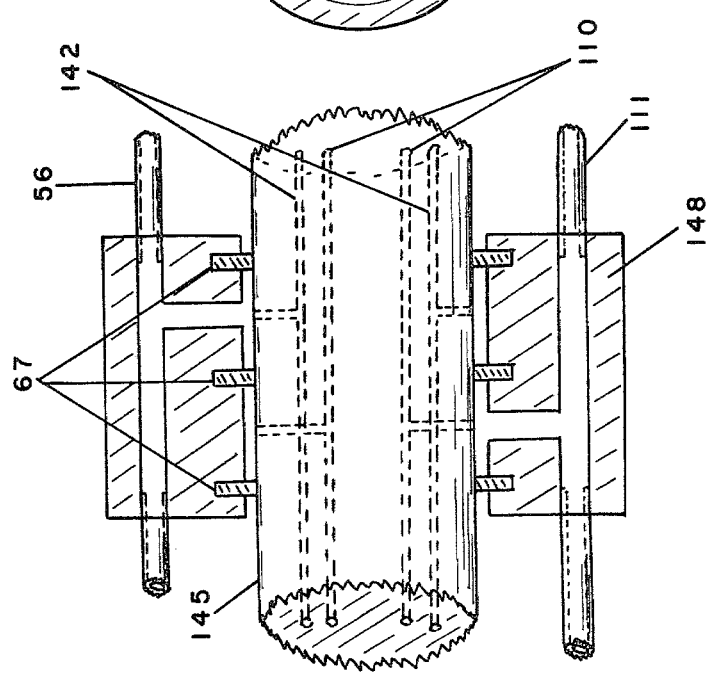
FIG. 9 is a sectional view of the main drive shaft with self-contained liquid and steam flow lines, and a friction sealing system between the main drive shaft and internal engine framework.

FIG. 9 represents the method of transfering a liquid from a stationary liquid line to the rotating main drive shaft 145, and the method of transfering steam from the rotating drive shaft 145 to a stationary steam line out. Liquid from the stationary liquid corridor 111 enters internal engine framework 148 and is directed to the rotating main drive shaft 145 between two friction seals 67. The liquid under pressure from the liquid pump driven by the accessory drive is forced into the liquid lines in 110. Steam leaving the steam line out 142 leaves drive shaft 145 between two friction seals 67 and enters the steam corridor 56 to be transferred to the steam nozzle 140 of FIGS. 1 & 3. The advantages of this system are that liquids may be transferred to and from the rotating drive shaft without effusing from the designed flow paths.

Figure 11:
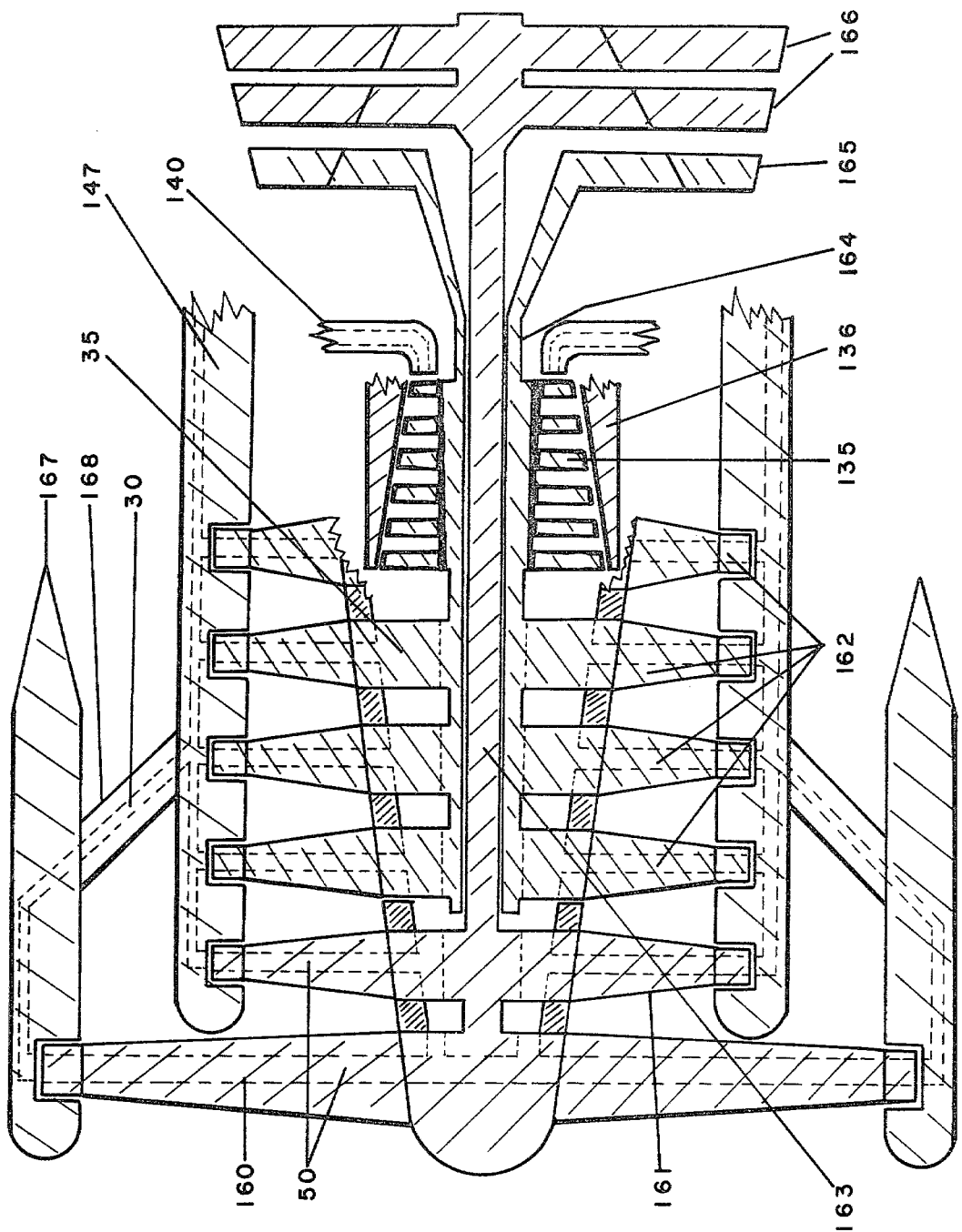
FIG. 11 is a side sectional view of a front fan twin-spool axial flow steam assisted gas turbine engine.

FIG. 11 represents a front fan twin spool axial flow steam assisted gas turbine engine. The operation of this engine is as follows. The front fan-compressor-condenser wheel 160 and the compressor-condenser wheel 161 comprise the low pressure fan-compressor-condenser spool. The compressor-condenser wheels 162 comprise the high pressure compressor-condenser spool. The low pressure spool is connected to the low pressure exhaust turbine wheels 166 with the low pressure drive shaft 163 resulting in the low pressure system. The high pressure spool is connected to the steam power turbine assembly 135 and the high pressure turbine wheel 165 by the high pressure drive shaft 164 resulting in the high pressure system. The high pressure system and the low pressure system are each capable of rotating individually at different speeds of rotation. Steam injected into the steam power turbine assembly 135 by the steam nozzles 140 provide steam assisted power to the high pressure system. Steam leaving the steam power turbine assembly is directed to all compressor-condenser wheels along steam passage corridor 35. This steam is consensed in the previously discussed manner in the compressor-condenser condensation corridors of all compressor-condenser wheels. The resulting condensate from the low pressure wheel 161 and high pressure wheels 162 are collected in steam condensation exit corridors located in the main engine casing as previously discussed. Condensate from the low pressure front fan-compressor-condenser wheel 160 is collected in a similar manner within the fan cowling 167 and directed to the condensation exit corridor located in the main engine casing 147 by the condensation exit corridor 30 located in the fan cowling support 168. All previously discussed advantages are applicable to this version of the engine. The advantages to these systems are that front fan twin-spool axial flow gas turbine engines may utilize steam power assistance for increased performance, fuel efficiency, and fuel economy. Alternate methods utilizing this technology include rear-fan gas turbine engines, steam assistance to the low pressure system, and steam assistance to both low and high pressure systems, as well as triple or multiple spool gas turbine engines. High pressure air and friction seals as previously discussed are utilized to create seals between the individual spools by obtaining high air pressure from the high pressure spool and directing this along a corridor located within the main drive shaft 145 to the desired high pressure seal applications.

Figure 12:
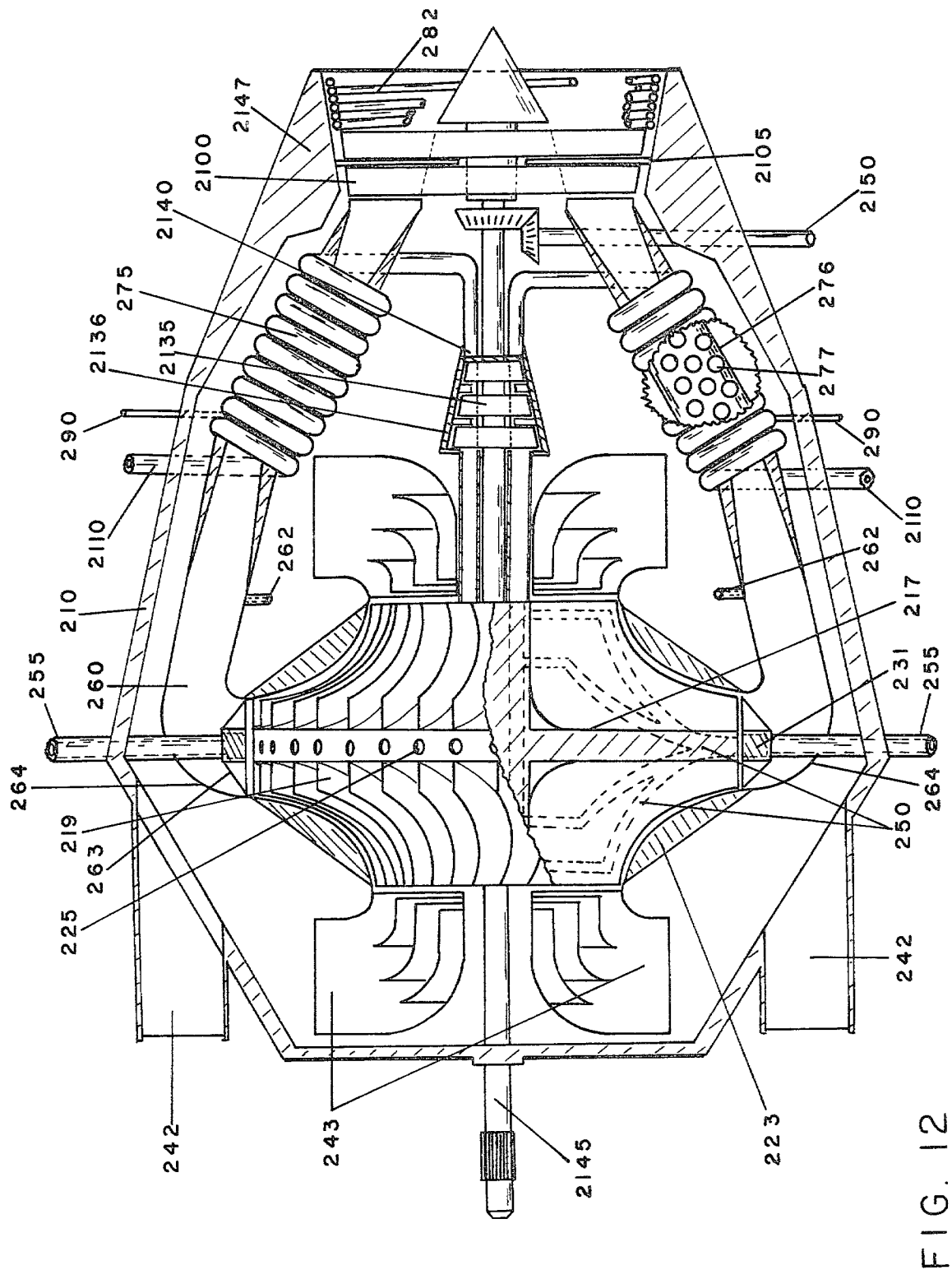
FIG. 12 is a side sectional view of a double-entry single-stage centrifugal steam assisted gas turbine engine.
Figure 13:
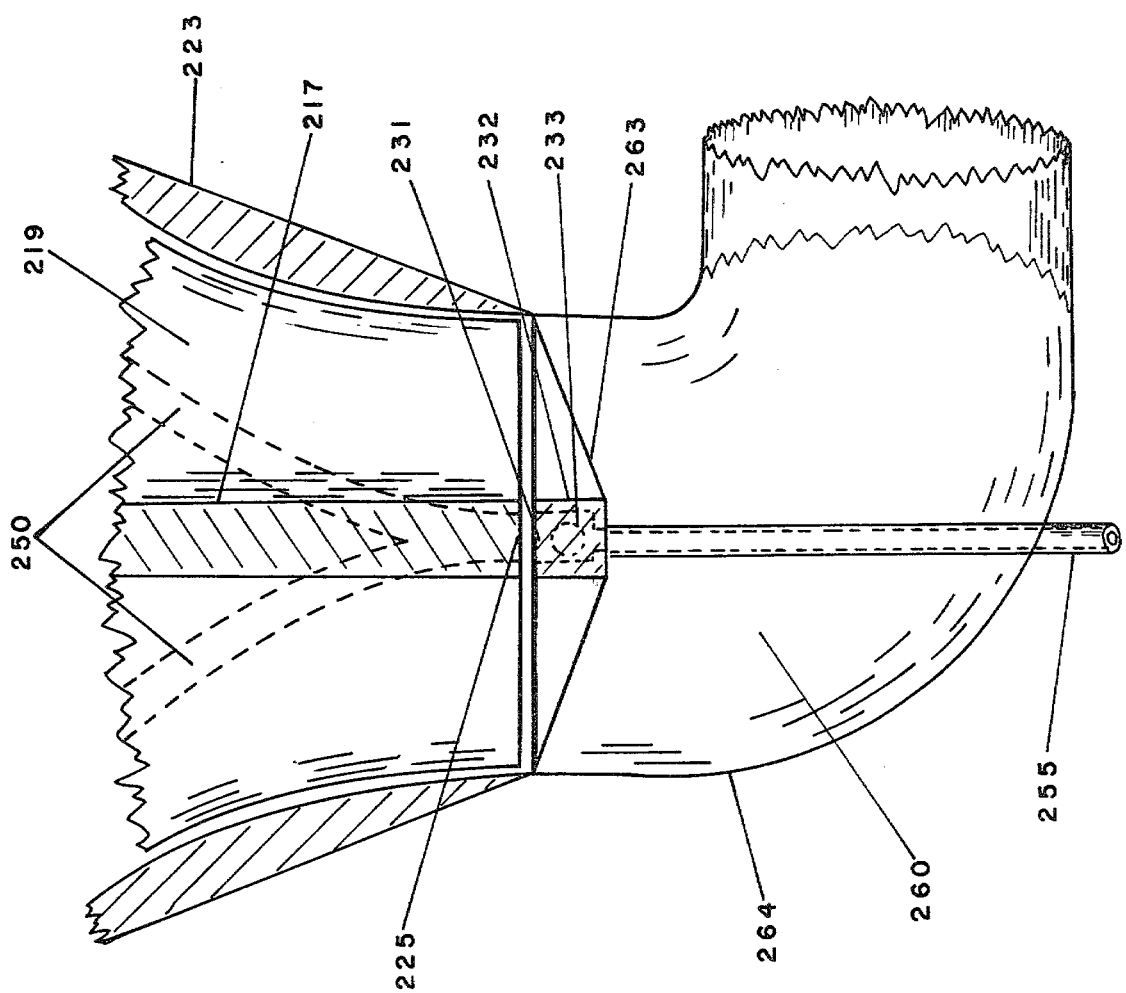
FIG. 13 is a side sectional view of a partial compressor-condenser double-entry impeller, condensation exit system, and compressor air outlet casing.

Referring now to FIG. 12, a double-entry single-stage centrifugal steam assisted gas turbine engine generally indicated at 210 is disclosed in accordance with the present invention. This engine differs from the axial spool type engine in that the compressor-condenser system is embodied in a centrifugal flow compressor-condenser impeller 219. Ambient atmospheric air enters the main engine casing 2147 through engine air intakes 242, then enters the centrifugal flow compressor-condenser impeller 219 through air intakes 243. Air is compressed by the spinning centrifugal motion of the compressor-condenser and forced into the high pressure air corridor 260. This high pressure air is then fueled and burned within the burner casing 276. Expanded and heated gases are then exhausted through the exhaust turbine wheels 2100 forcing the wheels to rotate prior to exiting the rear exhaust of the engine. Steam is generated in this engine by the steam boiler tubeing assembly 275, exhaust nozzle heat exchanger tubeing 282, and heat exchangers located beyond the exhaust cone. The resulting steam enters the steam turbine casing 2136 through steam nozzles 2140. The steam is forced and expanded within the steam power turbine assembly 2135 generating motive power which is transferred to the main drive shaft 2145. Referring to to FIG. 15, steam leaving the steam power turbine assembly passes through the steam exit corridor 254 and enters the centrifugal flow compressor impeller 219, flowing through the compressor-condenser condensation corridors 253 and 250. A high pressure air seal between the steam turbine casing 2136 and the impeller 219 is created by the injection of high pressure air into the high pressure air line 262 and out the air seal high pressure nozzle 265. The steam is condensed through a heat exchange process with the compressing air. FIGS. 13 & 14 show the condensate path 250 and the method of transferring the condensate from the impeller condensation exit port to the condensation entrance ports 231 and condensation lines out 255. The condensation entrance corridor housing 232 is circular in design and completely surrounds the impeller condensation exit port 225. The distance between the exit port 225 and the corridor housing 232 is designed to a close tolerance. As the impeller condensation exits ports 225 spin, they release the condensate which flows into the entrance to condensation exit port and corridor 231. High pressure air from the compressing action of the spinning compressor-condenser impeller surrounds the space between the condensation exit port 225 and the entrance to the condensation exit port 231 creating a high pressure air seal. Condensate from the entrance ports 231 is collected within the condensate corridor 233 and forced to flow under pressure through the steam condensation line out 255. High air pressure from the compressing process flows out of the high pressure impeller casing 263 through compressor air outlet casings 264 to the combustion chambers. The advantages of these systems are that gas turbine engines with centrifugal impellers can benefit from steam power assistance. Centrifugal impeller gas turbine engines with steam assistance can provide an efficient and economical power source for aircraft, land vehicles, and land power supplies over and above currently available methods. The main drive shaft 2145 can be connected to gear reductions to provide mechanical power to a variety of mechanisms. A large number of heat exchangers can be placed in front of the air intakes and behind the exhaust exit to increase the efficiency of the heat exchange processes. The concepts disclosed in accordance with the present invention are not limited to double-entry single-stage centrifugal steam assisted gas turbine engines, but can be equally applied to single-entry multiple stage centrifugal steam assisted gas turbine engines.

It is understood that the present invention is not limited to the particular construction and arrangement of parts disclosed and illustrated herein, but embraces all such modified forms thereof as come within the scope of the following claims:

What is claimed is:

1. A gas turbine engine having in combination a compressor, a combustion chamber downstream therefrom, means for introducing air and fuel as components which form the main stream flow entering the combustion chamber, means for maintaining combustion in the combustion chamber, at least one turbine rotor wheel bearing turbine blades downstream from the combustion chamber and driven by the combustion gas flow, wherein the improvements comprise:

a. a rotor wheel compressor-condenser unit with at lease one compressor-condensor rotor wheel with internal passages therein capable of exchanging heat from a vapor and transferring this heat to the elastic fluid being compressed during the operation of the compressor-condenser unit, condensing the vapor to a liquid, b. a combustion chamber comprising a burner casing, heat dilution holes in the burner casing, a heat-exchanger-boiler unit comprising annular tubing surrounding the burner casing and sealed against pressure loss of combustion gases, c. a steam powered turbine enclosed in a casing within a main engine casing, attached to a main drive shaft, driven by an expanding heated fluid, heated by a heat absorbing process utilized to cool various components of the gas turbine engine, d. a means of directing a fluid from a liquid pump immersed in a liquid collection tank, powered by an accessory drive shaft, through components including said heat-exchanger boiler heated by engine operation for heat absorption, into the steam turbine for production of power, through condensing components including said compressor-condenser rotor wheel for conversion to a liquid, through a liquid-air separator, and into the liquid collection tank for recycling, e. a means of transferring the condensate from the rotating compressor-condenser wheels to fixed condensate entrance ports located within shroud corridors which are connected to condensate corridors located in the main engine casing, f. a means to prevent loss of condensate during the transferring process utilizing high-pressure air bled from the compressor and directed through a high pressure corridor to nozzles which direct the air to compressor-condenser shroud edges, forming an air pressure seal between the shroud and the engine casing, g. a means of utilizing incurvate corridors on the edges of the compressor-condenser shroud and the engine casing to provide uniform high pressure for sealing, h. the use of adjustable compressor-condenser guide vanes as a means of cooling or condensing a heated fluid flowing within corridors within the guide vanes, a means for transferring fluids between adjustable guide vanes and fluid corridors located within the main engine housing, utilizing friction seals to prevent effusion of the two separated fluids into each other, or into the interior or exterior of the main engine casing, j. a means of boiling a fluid in an exhaust turbine-boiler rotor wheel during the operation of the engine by the flowing of a liquid into corridors, absorbing exhaust gas heat, vaporizing the liquid, and exiting through a corridor located within the rotor wheel, k. a means of transferring a vapor and a fluid to and from said exhaust turbine-boiler rotor wheel located on the main drive shaft through common corridors connected with the main drive shaft, l. a means of injecting and extracting a vapor and a fluid between the main drive shaft and a fixed internal engine framework with the use of friction seals to prevent effusion of the two separated fluids into each other, or into the interior of the engine, m. a means of providing a de-icing system for an intake cone, air intake guide vanes, and leading edges of the engine casing by utilizing the heat exchange of a condensing vapor and the resulting condensate to provide heat to these components, n. a means of capturing exhaust gas heat through the use of a heat absorbing fluid passing through annular tubing located within an exhaust nozzle of the gas turbine engine, and o. a means of transferring a heated fluid or vapor from the exhaust nozzle to a fuel exchanger and combustion chamber heat exchanger by utilizing corridors located within the main engine housing.

2. The combination recited in claim 1 wherein the compressor-condenser comprises more than one stage, comprising more than one spool of compressor-condensor wheels, wherein the exhaust turbine section comprises more than one exhaust turbine-boiler wheel spool, and wherein the various sets are connected through more than one drive shaft.

3. The combination recited in claim 2 wherein the first spool of the compressor-condenser, or the last spool of the exhaust turbine-boiler contains a fan or propeller extending beyond the limits of the main engine casing, and wherein the fan or propeller contains a shroud which is located within a cowling which contains condensate entrance corridors, high pressure air seals utilizing incurvate corridors located within the walls of the shroud and cowling, and supports between the cowling and main engine casing containing condensate corridors which transfer condensate from the cowling condensate corridors to the main engine casing condensate corridors.

4. The combination recited in claim 1 wherein the compressor-condenser comprises a centrifugal flow compresser-condenser impeller with fluid condensation corridors entering in at least one edge of the impeller located near the main drive shaft, and passing through the individual impeller blades, exiting at the outer edge of the impeller.

5. The combination recited in claim 4 wherein the exiting condensate leaving the rotating impeller exit ports enters a fixed condensation corridor with entrance ports located immediately adjacent to rotating impeller condensation exit ports, the condensation corridor being sealed to prevent effusion of the passing condensate into the compressed air flow by the compressed air leaving the impeller.

6. The combination recited in claims 4 or 5 wherein the compressor-condenser comprises a double-entry centrifugal compressor-condenser impeller.

7. The combination recited in claims 4 or 5 wherein the compressor-condenser comprises more than one centrifugal compressor-condenser impeller.

8. The combination recited in claims 4 or 5 wherein the corridor between the steam power turbine exhaust casing and the first impeller edge or multiple impeller edges is sealed with high pressure air bled from the compressor to incurvate corridors located within the walls of the impeller(s) edge(s) and the steam power turbine exhaust casing wall.

9. The combination recited in claim 1 wherein the annular tubing about the combustion chamber is sealed at its joining edges to prevent loss of combustion gas pressure.

10. The combination recited in any one of the claims 1–5 wherein the steam powered turbine comprises more than one steam powered assembly attached to, and designed to enhance power of the main drive shaft.

* * * * *